United States Patent
Czaplewski et al.

(10) Patent No.: US 10,330,236 B2
(45) Date of Patent: Jun. 25, 2019

(54) PIPELINE REPAIR

(71) Applicant: International Business Machines Corporation, Armonk, NY (US)

(72) Inventors: Sarah K. Czaplewski, Rochester, MN (US); Joseph Kuczynski, North Port, FL (US); Melissa K. Miller, Research Triangle Park, NC (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/822,878

(22) Filed: Nov. 27, 2017

(65) Prior Publication Data
US 2018/0106411 A1  Apr. 19, 2018

Related U.S. Application Data

(63) Continuation of application No. 14/932,666, filed on Nov. 4, 2015, now Pat. No. 9,863,569.

(51) Int. Cl.
| | | |
|---|---|---|
| *F16L 55/16* | (2006.01) | |
| *F16L 55/164* | (2006.01) | |
| *F16L 55/18* | (2006.01) | |
| *C09K 3/12* | (2006.01) | |
| *B29C 65/00* | (2006.01) | |
| *B29C 73/04* | (2006.01) | |
| *B29C 35/08* | (2006.01) | |

(52) U.S. Cl.
CPC ......... *F16L 55/164* (2013.01); *B29C 65/00* (2013.01); *C09K 3/12* (2013.01); *F16L 55/18* (2013.01); *B29C 73/04* (2013.01); *B29C 2035/0827* (2013.01)

(58) Field of Classification Search
CPC ........................................................ F16J 15/14
USPC ............... 405/184.1, 184.2; 138/97; 277/316
See application file for complete search history.

(56) References Cited

U.S. PATENT DOCUMENTS

| | | |
|---|---|---|
| 3,144,049 A | 8/1964 | Irwin Ginsburgh |
| 4,244,895 A | 1/1981 | Nakashin |
| 4,731,982 A | 3/1988 | Grant et al. |

(Continued)

FOREIGN PATENT DOCUMENTS

| | | |
|---|---|---|
| CN | 101760177 A | 6/2010 |
| EP | 0393407 A1 | 10/1990 |

(Continued)

OTHER PUBLICATIONS

Graham-Rowe, Duncan, "Self Healing Pipelines", MIT Technology Review, Dec. 21, 2006, 2 pp.
List of IBM Patents or Applications Treated as Related.

*Primary Examiner* — Sean D Andrish
(74) *Attorney, Agent, or Firm* — Patterson + Sheridan, LLP

(57) ABSTRACT

In an example, a method of repairing a pipeline includes isolating a section of a pipeline that includes a leak site. The method includes flooding the section of the pipeline with a plug formulation that includes artificial platelets and an ultraviolet (UV) photoinitiator. The section may be pressurized to induce migration of the artificial platelets to the leak site. The method also includes draining excess plug formulation from the section of the pipeline. The method further includes exposing the UV photoinitiator to UV light to form a gas impermeable seal at the leak site.

17 Claims, 5 Drawing Sheets

(56) References Cited

U.S. PATENT DOCUMENTS

| | | | |
|---|---|---|---|
| 5,064,486 A | 11/1991 | Kallenbach et al. | |
| 5,928,447 A | 7/1999 | GianFrancisco | |
| 7,094,308 B1 | 8/2006 | Gearhart | |
| 7,241,828 B2 * | 7/2007 | Kyte | ............... C04B 26/02 |
| | | | 524/423 |
| 7,513,275 B2 | 4/2009 | Lazzara | |
| 2009/0211770 A1 | 8/2009 | Nutley et al. | |
| 2010/0282469 A1 | 11/2010 | Richard et al. | |
| 2011/0221137 A1 | 9/2011 | Obi et al. | |
| 2015/0219250 A1 | 8/2015 | Ericsson et al. | |
| 2017/0122481 A1 | 5/2017 | Czaplewski et al. | |

FOREIGN PATENT DOCUMENTS

| | | |
|---|---|---|
| EP | 1591470 A1 | 11/2005 |
| GB | 2226865 A | 7/1990 |
| JP | 2007051268 A | 3/2007 |
| JP | 2009109004 A | 5/2009 |
| WO | 2005103121 A1 | 11/2005 |

* cited by examiner

PIPELINE REPAIR

CROSS-REFERENCE TO RELATED APPLICATIONS

This application is a continuation of U.S. patent application Ser. No. 14/932,666, filed Nov. 4, 2015, herein incorporated by reference in its entirety.

I. FIELD OF THE DISCLOSURE

The present disclosure relates generally to pipeline repair.

II. BACKGROUND

Leaks in pipelines (e.g., natural gas pipelines) may result in a considerable amount of gas escaping into the environment. In some cases, pinpointing leaks may be challenging, particularly in the case of buried pipelines. Further, excavating a buried pipeline to repair leaks may be expensive or impractical. Additionally, repairing a leak in a gas pipeline may be more challenging than repairing a leak in a liquid pipeline, as a seal or "plug" of a gas pipeline leak may be ineffective unless the seal is airtight.

III. SUMMARY OF THE DISCLOSURE

According to an embodiment, a method of repairing a pipeline is disclosed. The method includes isolating a section of a pipeline that includes a leak site and flooding the section of the pipeline with a plug formulation that includes artificial platelets and an ultraviolet (UV) photoinitiator. The method includes pressurizing the section to induce migration of the artificial platelets to the leak site. The method also includes draining excess plug formulation from the section of the pipeline. The method further includes exposing the UV photoinitiator to UV light to form a gas impermeable seal at the leak site.

According to another embodiment, a plug formulation for repairing a pipeline is disclosed. The plug formulation comprises a mixture of an acrylate monomer solution, artificial platelets, and a UV photoinitiator.

According to another embodiment, a method of repairing a gas pipeline is disclosed. The method includes identifying a section of a gas pipeline that includes a leak site and isolating the section of the gas pipeline. The method includes flooding the section of the gas pipeline with a plug formulation that includes a mixture of an acrylate monomer solution, artificial platelets, and a UV photoinitiator. The method also includes pressurizing the section of the gas pipeline to induce migration of the artificial platelets to the leak site and draining excess plug formulation from the section of the gas pipeline. The method further includes exposing the UV photoinitiator to UV light to form a gas impermeable seal at the leak site.

One advantage of the present disclosure is the ability to repair a pipeline (e.g., a gas pipeline) using a liquid leak repair formulation that includes "artificial platelets" that may form a substantially gas impermeable seal at a leak site. Another advantage of the present disclosure is the ability to repair the pipeline without identifying location(s) of leak(s) in the isolated section of pipeline, as an entire isolated section is flooded with the liquid leak repair formulation.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

Figure 1A:
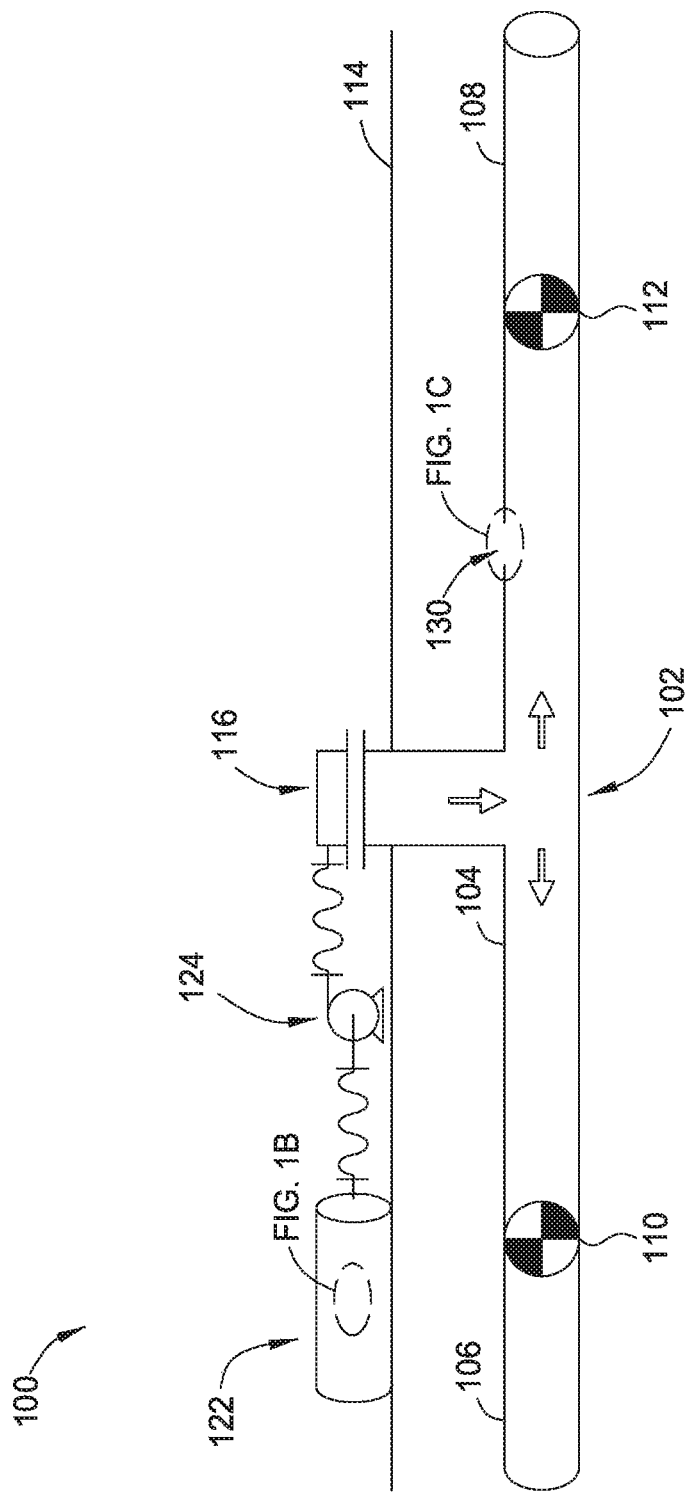
FIG. 1A is a diagram illustrating a first stage of pipeline repair, according to one embodiment.

The present disclosure describes fluid formulations for use in repairing pipelines (e.g., gas pipelines, such as buried natural gas pipelines) and methods of repairing pipelines using such fluid formulations. In the present disclosure, particles (referred to herein as "artificial platelets") that are designed to mimic natural platelets that heal a wound by clotting to form a "scab" at a wound site may be used to repair a leak in a pipeline in a similar manner. To illustrate, a section of pipeline that is identified as having one or more leaks may be isolated, and the section of pipeline may be flooded with a fluid formulation that includes the artificial platelets (also referred to herein as a "plug formulation"). Pressurizing the fluid may induce the artificial platelets in the plug formulation to migrate to a leak site (or multiple leak sites) in order to form a "clot" at the leak site. In some cases, the fluid formulation may include a resin that is curable using ultraviolet (UV) light to form a gas impermeable seal (also referred to herein as an "artificial scab"). After plugging the leak site(s) using the artificial platelets, excess plug formulation may be drained from the isolated section of pipeline, and an autonomous robot may be used to expose the UV curable resin to UV light in order to cure the resin. After formation of the artificial scab(s), the autonomous robot may be removed from the isolated section of pipeline, and the isolated section of pipeline may be reconnected. As an alternative example, rather than flooding the isolated section of pipeline with the plug formulation, the autonomous robot may be deployed to spray coat the interior of the pipeline, and the autonomous robot may be removed. The isolated section of pipeline may then be pressurized to force the plug formulation into the cracks, the pressure may be released, and the autonomous robot may be redeployed to UV cure the formulation.

While artificial platelets may represent a promising technology for repair of condensed fluid pipelines (e.g., oil or water), a seal that is formed using artificial platelets alone may be ineffective in the context of gas pipelines. To illustrate, the seal may allow natural gas to diffuse around the jammed platelets and eventually leak into the surrounding environment. In a particular embodiment of the present disclosure, a plug formulation may include artificial platelets incorporated into a multifunctional acrylate monomer solution containing a UV photoinitiator (or multiple initiators). After flooding an isolated section of a pipeline with pressurized plug formulation fluid to induce the artificial platelets to "clot" at the leak site(s), the remaining plug formulation may be drained from the isolated section of the pipeline. UV curing may then be initiated to form a tightly cross-linked network that is substantially impervious to gas diffusion. Thus, in the present disclosure, a liquid plug formulation including artificial platelets may allow for repair of a gas pipeline without expensive excavation costs (in the case of a buried pipeline) and without isolating individual leaks, as an entire section of pipeline is flooded with the liquid plug formulation to induce the artificial platelets to fill cracks at each leak site.

Referring to FIG. 1A, a diagram 100 of a first stage of pipeline repair using a plug formulation of the present disclosure is illustrated. In FIG. 1A, a section of pipeline (e.g., a buried natural gas pipeline) that is identified as having a leak (or multiple leaks) may be isolated from other sections of pipeline. The isolated section of pipeline may be flooded with a liquid plug formulation including artificial platelets and pressurized. As shown in FIG. 1A, the artificial platelets in the plug formulation may migrate to a leak site (or multiple leak sites) to plug the leak (or multiple leaks). As described further herein with respect to FIGS. 2A and 2B, after plugging the leak(s), in a particular embodiment an autonomous robot may be deployed to initiate UV curing, resulting in formation of an artificial scab (or multiple scabs) at the plugged leak site (or multiple plugged leak sites) that may be substantially impervious to gas diffusion.

In the particular embodiment illustrated in FIG. 1A, a pipeline 102 includes multiple sections, including a first section 104, a second section 106, and a third section 108. As shown in the example of FIG. 1A, the first section 104 of the pipeline 102 may be isolated by closing a first valve 110 between the first section 104 and the second section 106 and by closing a second valve 112 between the first section 104 and the third section 108. In the particular embodiment illustrated in FIG. 1A, the pipeline 102 is located below ground 114 and may be accessible via an access port 116. While not shown in FIG. 1A, it will be appreciated that various equipment may be deployed above the ground 114 and/or below the ground 114 in order to enable isolation of and/or access to a particular section of the pipeline 102 (e.g., the first section 104) without excavation of the pipeline 102. In alternative embodiments, one or more sections of the pipeline 102 may be above the ground 114.

Figure 1B:
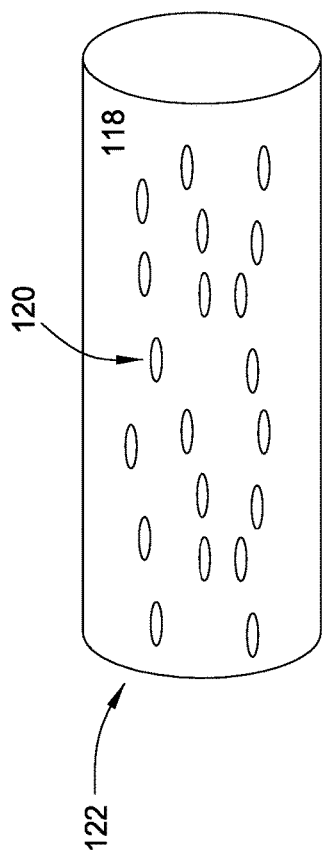
FIG. 1B is an expanded view of storage 122, according to one embodiment.

FIGS. 1A and 1B illustrate that the first stage of pipeline repair includes flooding the first section 104 of the pipeline 102 with a liquid plug formulation 118 that includes artificial platelets 120. For illustrative purposes only, the artificial platelets 120 of FIG. 1B are depicted as substantially elliptical shapes having substantially similar sizes. In some cases, the artificial platelets 120 may include a variety of shapes, sizes, materials, or any combination thereof. As an illustrative, non-limiting example, the artificial platelets 120 may vary in size from 0.3 to 50 millimeters, with shapes ranging from discs to cubes. In some cases, the "hardness" of the artificial platelets 120 may be tailored to a particular pipeline environment. In some cases, a material that is too "soft" may be subject to platelet deformation under pressure, resulting in the platelet being "squished" through a leak site. A material that is too "hard" may not stem the flow of fluid at the leak site. Thus, it will be appreciated that the artificial platelets 120 depicted in FIG. 1B represent non-limiting examples of particles for purposes of illustrating formation of an artificial clot at one or more cracks in the pipeline 102.

Figure 1C:
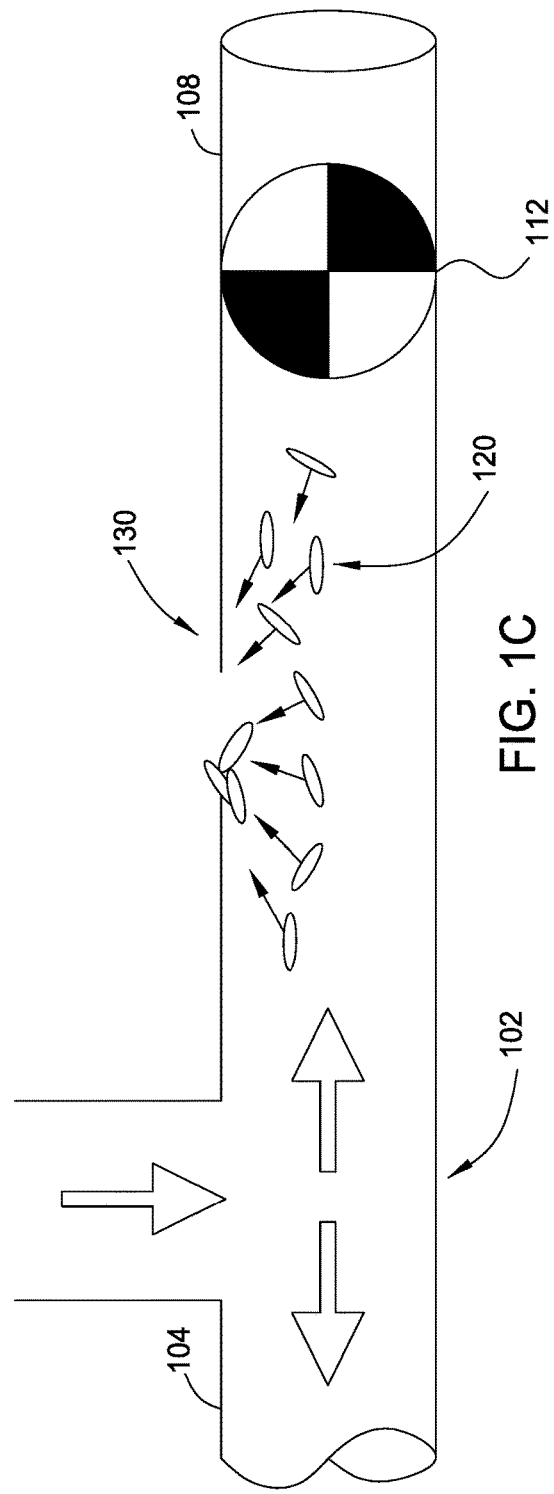
FIG. 1C is an expanded view of leak site(s) 130, according to one embodiment.

In the example of FIGS. 1A and 1B, the plug formulation 118 is shown in storage 122 and may be introduced into the first section 104 of the pipeline 102 via the access port 116 using a pump 124. As shown by the fluid flow arrows of FIG. 1A, the pump 124 may flood the first section 104 of the pipeline 102 with the plug formulation 118 and may pressurize the first section 104 with fluid. The introduction of the pressurized fluid may cause the artificial platelets 120 to aggregate at a leak site 130, resulting in formation of an artificial clot at the leak site 130. While FIG. 1C depicts an example of an artificial clot being formed at a single leak site (the leak site 130), it will be appreciated that the introduction of the pressurized liquid plug formulation 118 into the first section 104 of the pipeline 102 may enable formation of multiple artificial clots at multiple leak sites within the first section 104 without determining the locations of the leak sites, as the entire interior of the pipe is exposed to the plug formulation 118.

In a particular embodiment, the plug formulation 118 may include the artificial platelets 120 and a multifunctional acrylate monomer solution containing a UV initiator. As an illustrative, non-limiting example, the plug formulation 118 may include about 50-70 weight percent trimethylolpropane trimethacrylate (TMPTA) and/or dipentaerythritol pentacrylate; a first photoinitiator for UV curing (e.g., about 2-5 weight percent); a second photoinitiator for radical polymerization of unsaturated resins upon UV light exposure (e.g., about 2-5 weight percent); and the artificial platelets 120 (e.g., about 20-46 weight percent).

In another embodiment, the artificial platelets 120 may be induced to swell after forming an initial artificial clot at the leak site(s) 130 in order to enhance seal strength. As an illustrative example, the artificial platelets 120 may be formed from a shape memory polymer (SMP) material that expands upon exposure to UV light, moisture, or heat. To illustrate, the artificial platelets 120 may be formed from a UV-activated shape memory polymer such that exposure to UV light (as illustrated and further described herein with respect to FIGS. 2A and 2B) would not only cure the resin but also enlarge the artificial platelets 120. In this example, enlarging/swelling the artificial platelets 120 may result in formation of an improved seal at the leak site(s) 130 compared to the artificial platelets 120 alone. In the case of SMPs that expand upon exposure to moisture, the plug formulation 118 may be pumped into the first section 104, followed by water to induce swelling of the artificial platelets 120. Subsequently, as illustrated and further described herein with respect to FIGS. 2A and 2B, an autonomous robot (among other alternatives, such as fiber optic cables) may be deployed in order to initiate UV curing.

In addition to UV curing, alternative approaches may be used to seal the artificial platelet clot that is formed at the leak site(s) 130. For example, the artificial platelets 120 may be cured in place through a chemical reaction. To illustrate, a two-part epoxy system may be utilized, where the artificial platelets 120 are carried through the first section 104 of the pipeline 102 in solution with one part of the epoxy system. In some cases, the first part of the epoxy system may also be covalently bonded to the artificial platelets 120. Subsequently, the second part of the epoxy system may be pumped through the first section 104 to initiate curing at the clot site. Yet another method may include the use of a plug formulation that may cure upon mixing but may require some time to set. In this case, the formulation may be removed from the pipe before curing is completed, leaving the formulation at the clot site to cure. As yet another example, a super absorbent polymer may be used to assist in plugging the leak. The super absorbent polymer material may expand upon exposure to moisture.

Thus, FIGS. 1A-1C illustrate an example of a first stage of pipeline repair using the plug formulation of the present disclosure. The first stage of pipeline repair includes the use of a liquid plug formulation that includes artificial platelets that are designed to mimic natural platelets by forming a clot at a pipeline leak site. As described further herein with respect to FIGS. 2A and 2B, after draining excess plug formulation liquid from an isolated section of pipeline, a UV curable resin in the plug formulation may be cured using UV light in order to form a substantially gas impermeable artificial scab at the leak site(s) that are plugged with the artificial platelets.

Figure 2A:
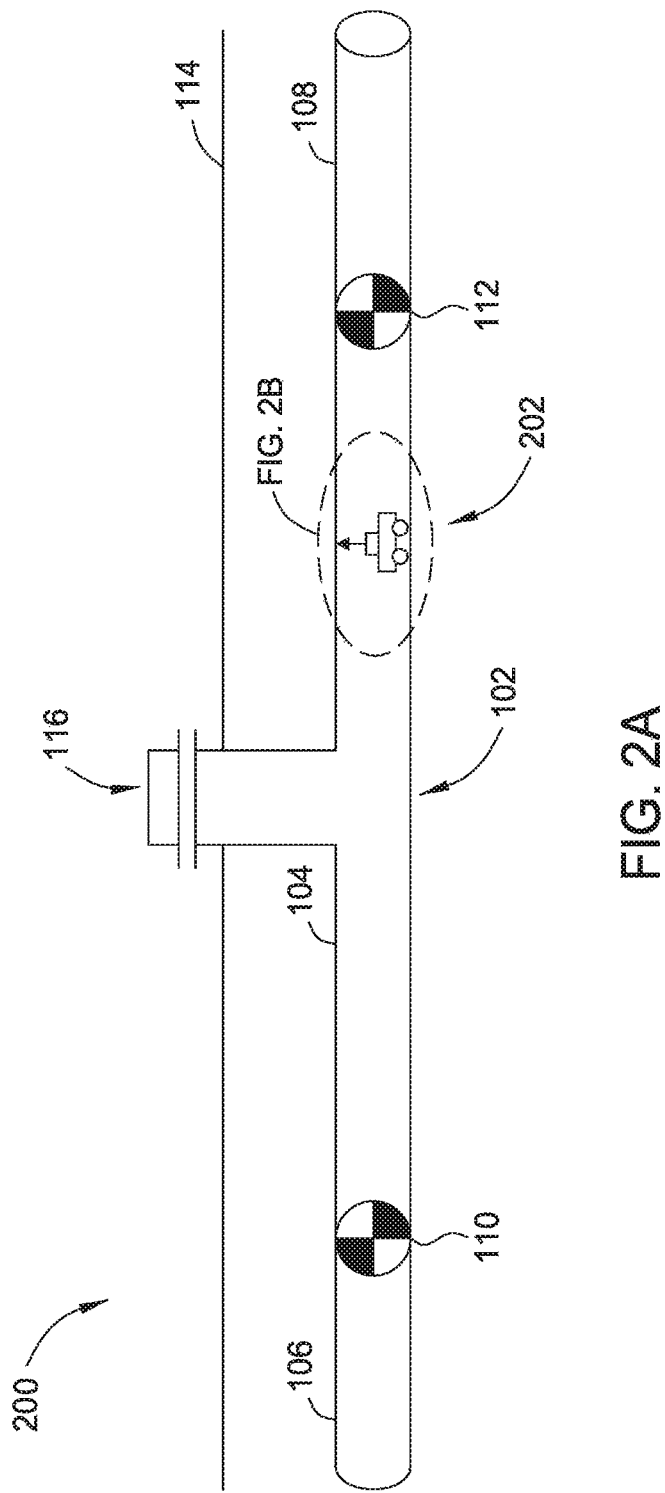
FIG. 2A is a diagram illustrating a second stage of pipeline repair, according to one embodiment.

Referring to FIG. 2A, a diagram 200 illustrates a second stage of pipeline repair that includes draining excess plug formulation from the isolated section of the pipeline and exposing the UV curable resin to UV light to form a substantially gas impermeable artificial scab. FIG. 2A illustrates an example in which an autonomous robot 202 is used to expose the UV curable resin to UV light. In other cases, alternative equipment (e.g., fiber optic cables) may be used to initiate UV curing.

Figure 2B:
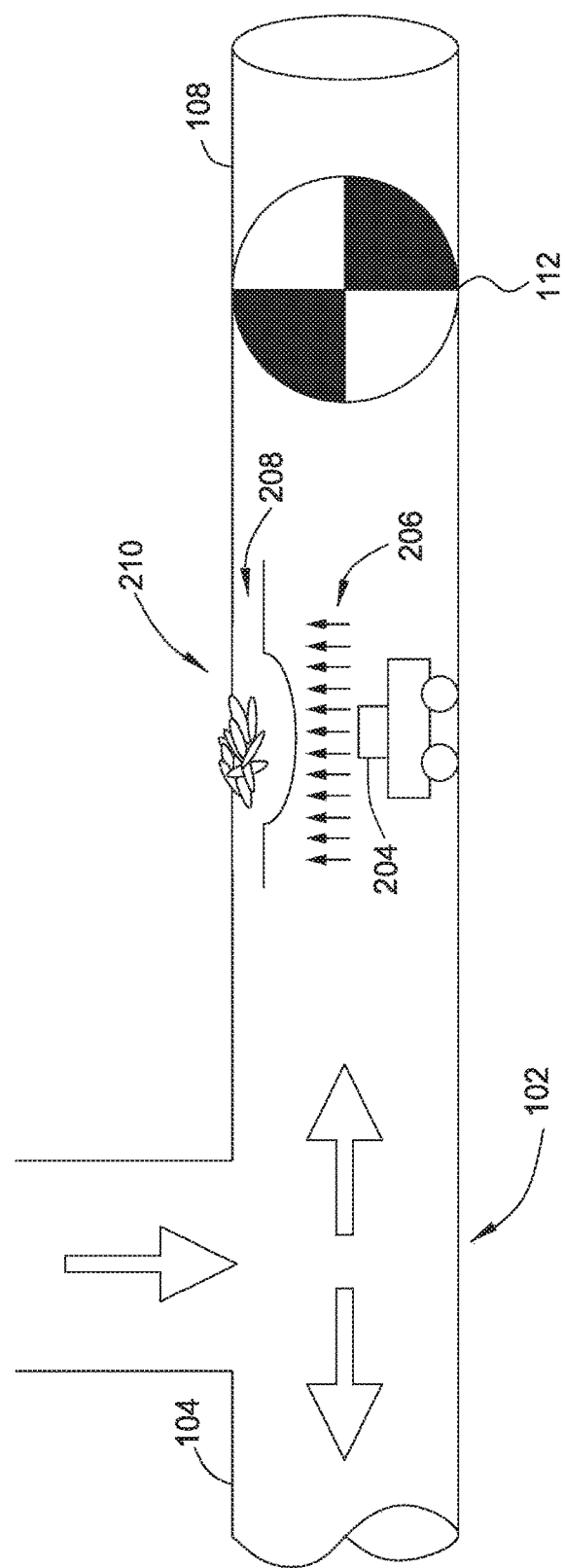
FIG. 2B is an expanded view of sealing of the leak site by an artificial scab, according to one embodiment.

In the particular embodiment illustrated in FIGS. 2A and 2B, the first section 104 of the pipeline 102 remains isolated and has been drained of excess plug formulation liquid. FIGS. 2A and 2B illustrate that, after draining the first section 104, the autonomous robot 202 may be deployed (e.g., via the access port 116 used to introduce the plug formulation 118 or via a different access port) into the first section 104. In FIGS. 2a and 2B, the autonomous robot 202 includes a UV light source 204 (or multiple UV light sources, such as several light "pipes" attached to a pressure mercury arc lamp) that emits UV light 206 in order to cure a UV curable resin 208, resulting in formation of an artificial scab 210 (that includes the clot formed by the artificial platelets 120 covered by a hard layer of cured resin material).

While not shown in FIGS. 2A and 2B, after the autonomous robot 202 has exposed the UV curable resin 208 to the UV light 206 in order to form the artificial scab 210, the autonomous robot 202 may be removed from the pipeline 102. Subsequently, the isolated first section 104 may be reconnected to the second section 106 of the pipeline 102 (e.g., by opening the first valve 110) and may be reconnected to the third section 108 of the pipeline 102 (e.g., by opening the second valve 112).

Thus, FIGS. 2A and 2B illustrates an example of a second stage of pipeline repair that includes deploying an autonomous robot for UV curing of a UV curable resin component of the plug formulation (after draining excess plug formulation that was introduced into the isolated section of the pipeline, as illustrated and described further herein with respect to FIGS. 1A-1C). Exposure of the UV curable resin to UV light may result in an improved seal at a platelet-plugged leak site that may reduce the ability of gas in the pipeline (e.g., methane) to diffuse around the clotted artificial platelets and to escape into the surrounding environment.

Figure 3:
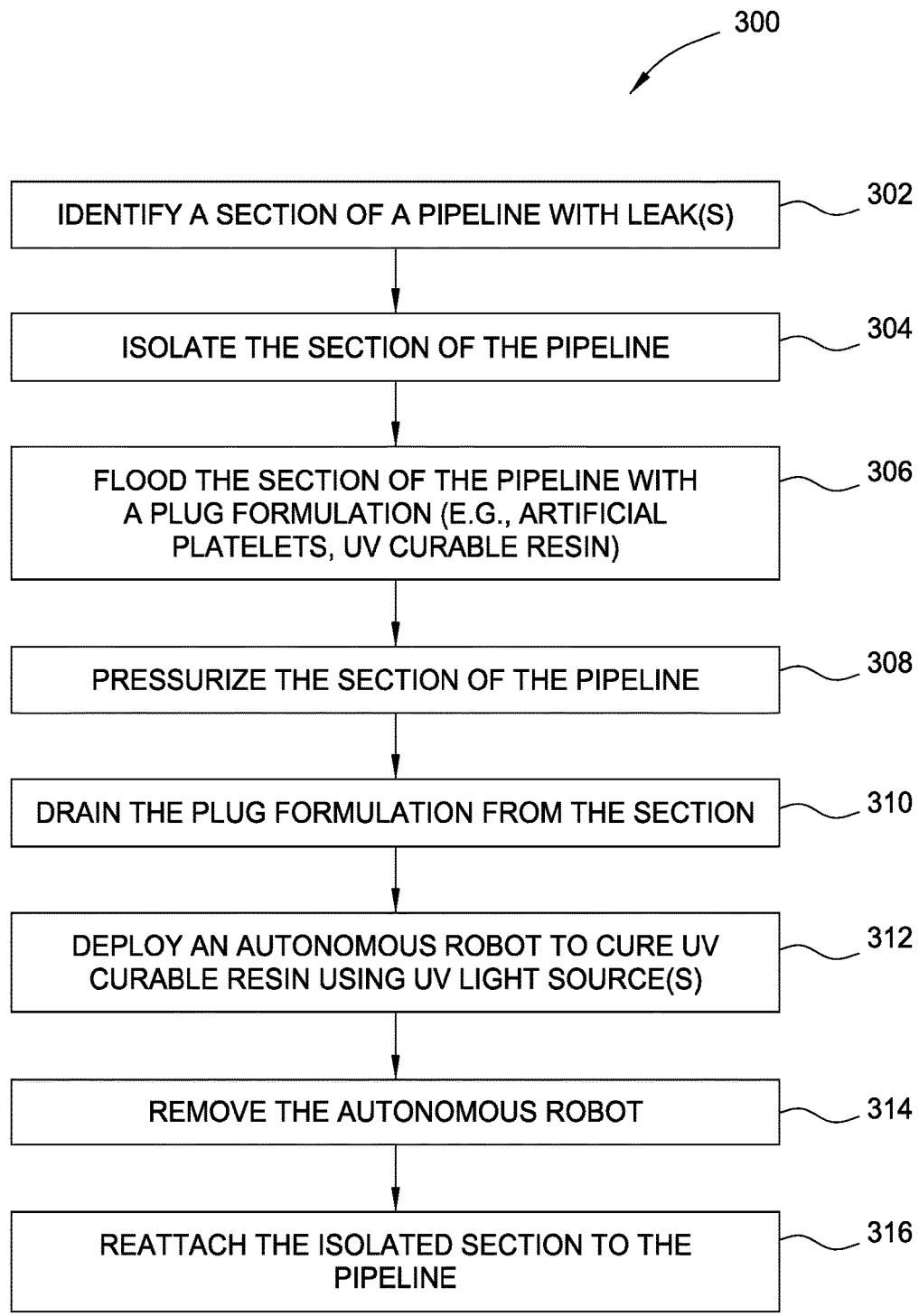
FIG. 3 is a flow diagram illustrating an embodiment of a method of repairing a pipeline.

Referring to FIG. 3, a particular embodiment of a method 300 of pipeline repair is illustrated. In the example of FIG. 3, the method 300 includes utilizing a plug formulation that includes a UV curable resin and deploying an autonomous robot to cure the resin using one or more UV light sources.

The method 300 includes identifying a section of a pipeline with a leak (or multiple leaks), at 302. For example, referring to FIGS. 1A and 1C, the first section 104 of the pipeline 102 may be identified as having one or more leaks. In the example of FIG. 1A, the pipeline 102 is illustrated as being buried below the ground 114. In other cases, one or more sections of the pipeline 102 may be above the ground 114. Further, in some cases, the pipeline 102 may be a gas pipeline (e.g., a natural gas pipeline), while in other cases the pipeline 102 may be a condensed liquid pipeline (e.g., an oil or water pipeline).

The method 300 includes isolating the section of the pipeline, at 304. For example, referring to FIG. 1A, the first section 104 of the pipeline 102 may be isolated from the second section 106 and the third section 108 of the pipeline 102. In the particular embodiment illustrated in FIG. 1A, the first section 104 of the pipeline 102 is shown as being isolated by closing the first valve 110 and the second valve 112. It will be appreciated that alternative methods of isolating a particular section of a pipeline may be used.

The method 300 includes flooding the section of the pipeline with a plug formulation, at 306. For example, referring to FIG. 1A, the first section 104 of the pipeline 102 may be flooded with the plug formulation 118 by introducing the plug formulation 118 into the isolated first section 104 via the access point 116 using the pump 124. While FIG. 1A illustrates an example of flooding the first section 104 at the access point 116 using the pump 124, it will be appreciated that alternative methods of introducing the plug formulation 118 into the pipeline 102 may be used.

The method 300 includes pressurizing the section of the pipeline, at 308. For example, referring to FIG. 1A, the first section 104 of the pipeline 102 may be pressurized with the plug formulation 118 using the pump 124. While FIG. 1A illustrates an example in which pressurization of the first section 104 includes the introduction of excess liquid plug formulation 118 using the pump 124, in some cases, the pressure in the first section 104 may be increased by introducing additional liquids and/or gases.

The method 300 includes draining the plug formulation from the section, at 310. For example, referring to FIG. 2A, the plug formulation 118 illustrated as flooding the first section 104 in FIG. 1A may be drained. While the pump 124 of FIG. 1A is not illustrated in FIG. 2A, in some cases, the plug formulation 118 may be removed from the first section 104 using the pump 124. Thus, while FIG. 2A illustrates the first section 104 after excess plug formulation 118 has been drained from the first section 104, it will be appreciated that an intermediate draining stage may precede the introduction of the autonomous robot 202 shown in FIG. 2A.

In the particular embodiment illustrated in FIG. 3, the method 300 includes deploying an autonomous robot to cure the UV curable resin using a UV light source (or multiple UV light sources), at 312. For example, referring to FIGS. 2A and 2B, the autonomous robot 202 may be deployed into the isolated first section 104 of the drained pipeline 102 via the access port 116. While FIG. 2A illustrates an example in which the same access point that is used to introduce the plug formulation 118 into the pipeline 102 is used for deployment of the autonomous robot 202, it will be appreciated that an alternative access point (e.g., a larger access point) may be used for deployment of the autonomous robot 202. FIGS. 2A and 2B illustrate that the autonomous robot 202 may include one or more UV light sources 204 that may be used to initiate curing of the UV curable resin 208 via exposure to the UV light 206. As shown in the example of FIG. 2B, curing of the UV curable resin 208 may result in formation of the artificial scab 210, sealing the leak site(s) 130 in the pipeline 102 in order to reduce/prevent fluid leakage (e.g., natural gas leakage) into the surrounding environment (e.g., into the ground 114 in the case of a buried pipeline).

In the particular embodiment illustrated in FIG. 3, the method 300 includes removing the autonomous robot, at 314. For example, while not shown in FIGS. 2A and 2B, after formation of the artificial scab 210, the autonomous robot 202 may be removed from the first section 104 of the pipeline 102 (e.g., via the access port 116).

The method 300 includes reattaching the isolated section to the pipeline, at 316. For example, referring to FIG. 2A, after removing the autonomous robot 202, the access port 116 may be closed, the first valve 110 may be moved to an open position, and the second valve 112 may be moved to an open position. As a result, the first section 104 may no longer be isolated from the second section 106 and the third section 108 of the pipeline 102, allowing fluid to flow through the first section 104.

Thus, FIG. 3 illustrates an example of a method of repairing a pipeline using a plug formulation of the present disclosure. In the particular embodiment illustrated in FIG. 3, the plug formulation includes artificial platelets and a UV curable resin, and an autonomous robot with one or more UV light sources is deployed to cure the resin. In other embodiments, as described herein, alternative plug formulations and/or curing methods may be employed in order to form a gas impermeable seal at one or more leak sites of a pipeline.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method of repairing a pipeline, the method comprising:
    isolating a section of the pipeline that includes a leak site;
    flooding the section of the pipeline with a plug formulation that includes artificial platelets, an ultraviolet (UV) photoinitiator, and a first part of a two-part epoxy system;
    pressurizing the section of the pipeline to induce migration of the artificial platelets to the leak site;
    draining excess plug formulation from the section of the pipeline;
    pumping a second part of the two-part epoxy system into the section of the pipeline to contact the first part of the two-part epoxy system; and
    exposing the UV photoinitiator to UV light delivered through a fiber optic cable to form a gas impermeable seal at the leak site.

2. The method of claim 1, wherein the plug formulation further includes a multi-functional acrylate monomer.

3. The method of claim 1, wherein the pipeline includes a gas pipeline.

4. The method of claim 1, wherein the pipeline includes a natural gas pipeline.

5. The method of claim 1, wherein the pipeline includes a buried natural gas pipeline.

6. The method of claim 1, wherein the artificial platelets have a characteristic dimension in a range of 0.3 millimeters to 50 millimeters.

7. The method of claim 1, wherein the artificial platelets include a first artificial platelet type having a first shape and a second artificial platelet type having a second shape that is different from the first shape.

8. The method of claim 1, wherein the artificial platelets include different platelet types having an elliptical shape, a disc shape, a cube shape, or a combination thereof.

9. The method of claim 2, wherein the artificial platelets are formed from a polymeric material that expands upon exposure to the UV light.

10. The method of claim 1, wherein the artificial platelets are formed from a polymeric material that expands upon exposure to moisture, the method further comprising exposing the section of the pipeline to moisture after draining the excess plug formulation from the section of the pipeline.

11. The method of claim 10, wherein the polymeric material includes a shape memory polymer material.

12. The method of claim 10, wherein the polymeric material includes a super absorbent polymer material.

13. The method of claim 1, wherein the artificial platelets are formed from a polymeric shape memory material that expands upon exposure to heat, the method further comprising exposing the section of the pipeline to heat.

14. A method of repairing a gas pipeline, the method comprising:
    identifying a section of the gas pipeline that includes a leak site;
    isolating the section of the gas pipeline;
    flooding the section of the gas pipeline with a plug formulation that includes artificial platelets, an ultraviolet (UV) photoinitiator, and a first part of a two-part epoxy system, a portion of the first part of the two-part epoxy system is covalently bonded to a portion of the artificial platelets;
    pressurizing the section of the gas pipeline to induce migration of the artificial platelets to the leak site;
    draining excess plug formulation from the section of the gas pipeline;
    pumping a second part of the two-part epoxy system into the section of the gas pipeline to contact the first part of the two-part epoxy system; and
    exposing the UV photoinitiator to UV light delivered through a fiber optic cable to form a gas impermeable seal at the leak site.

15. The method of claim 14, wherein the gas pipeline includes a buried natural gas pipeline, and wherein the section is flooded with the plug formulation without identifying a location of the leak site within the buried natural gas pipeline.

16. The method of claim 14, wherein the plug formulation further includes a multi-functional acrylate monomer.

17. The method of claim 16, wherein the artificial platelets are formed from a polymeric material that expands upon exposure to the UV light.

* * * * *